US012447364B2

(12) United States Patent
Shields et al.

(10) Patent No.: US 12,447,364 B2
(45) Date of Patent: Oct. 21, 2025

(54) SPRINKLER ASSEMBLY WITH BUTTON

(71) Applicant: Tyco Fire Products LP, Cranston, RI (US)

(72) Inventors: Steven Lee Shields, Lubbock, TX (US); Manuel R. Silva, Jr., Cranston, RI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

(21) Appl. No.: 18/303,959

(22) Filed: Apr. 20, 2023

(65) Prior Publication Data

US 2023/0256278 A1 Aug. 17, 2023

Related U.S. Application Data

(63) Continuation of application No. 16/589,738, filed on Oct. 1, 2019, now Pat. No. 11,660,482.

(60) Provisional application No. 62/740,247, filed on Oct. 2, 2018, provisional application No. 62/740,243, filed on Oct. 2, 2018, provisional application No. 62/740,268, filed on Oct. 2, 2018.

(51) Int. Cl.

| | |
|---|---|
| ***A62C 37/08*** | (2006.01) |
| ***A62C 35/68*** | (2006.01) |
| ***A62C 37/12*** | (2006.01) |
| ***B05B 1/30*** | (2006.01) |
| ***B05B 3/04*** | (2006.01) |

(52) U.S. Cl.

CPC .............. *A62C 37/08* (2013.01); *A62C 35/68* (2013.01); *A62C 37/12* (2013.01); *B05B 1/30* (2013.01); *B05B 3/0486* (2013.01)

(58) Field of Classification Search

CPC ......... A62C 37/08; A62C 37/20; A62C 35/68; A62C 37/12; B05B 1/30; B05B 3/0486

USPC ............. 169/37, 90, 38, 39, 40, 41; 239/569

See application file for complete search history.

(56) References Cited

U.S. PATENT DOCUMENTS

| | | | | |
|---|---|---|---|---|
| 2,180,633 | A | 11/1939 | Holt | |
| 3,010,521 | A | 11/1961 | Seaberg | |
| 3,061,016 | A | 10/1962 | Hodman | |
| 5,213,016 | A | 5/1993 | Kah, Jr. | |
| 5,670,997 | A | 9/1997 | Sugimoto et al. | |
| 6,077,267 | A | 6/2000 | Huene | |
| 6,840,329 | B2 | 1/2005 | Kikuchi et al. | |
| 6,962,208 | B2 | 11/2005 | Franson et al. | |
| 7,021,392 | B2 | 4/2006 | Bentzien et al. | |
| 7,275,603 | B2 | 10/2007 | Polan | |
| 8,151,897 | B1 * | 4/2012 | Meyer .................... | A62C 37/08 239/524 |
| 11,484,739 | B2 * | 11/2022 | Thompson ............. | A62C 37/12 |

(Continued)

*Primary Examiner* — Christopher S Kim

(74) *Attorney, Agent, or Firm* — Foley & Lardner LLP

(57) ABSTRACT

A sprinkler includes a body defining (a) a passage having an inlet configured to be fluidly coupled to a source of fire suppressant fluid, (b) an outlet fluidly coupled to the passage, and (c) a compression pin aperture extending from an outer surface of the body to the passage and configured to receive a compression pin, a button received within the passage, and a seal engaging the button and the body to fluidly seal the inlet from the outlet. The compression pin aperture is positioned such that the compression pin engages the button to force the button against the seal when the compression pin is inserted into the compression pin aperture.

15 Claims, 13 Drawing Sheets

(56) References Cited

U.S. PATENT DOCUMENTS

| | | | | |
|---|---|---|---|---|
| 11,660,482 | B2 * | 5/2023 | Shields .................. | A62C 37/12<br>169/37 |
| 2004/0134670 | A1 | 7/2004 | Orr et al. | |
| 2006/0201286 | A1 | 9/2006 | Ide | |
| 2008/0083305 | A1 | 4/2008 | Miley | |
| 2009/0244579 | A1 | 10/2009 | Inoue | |
| 2011/0036598 | A1 * | 2/2011 | Pahila .................... | A62C 3/002<br>169/37 |
| 2013/0014963 | A1 | 1/2013 | Porta | |
| 2013/0306334 | A1 | 11/2013 | Koiwa | |
| 2015/0083442 | A1 | 3/2015 | Koiwa | |
| 2016/0030785 | A1 | 2/2016 | Ringer et al. | |
| 2017/0319884 | A1 | 11/2017 | Oldham | |
| 2021/0205648 | A1 * | 7/2021 | Thompson ............. | A62C 37/12 |

* cited by examiner

SPRINKLER ASSEMBLY WITH BUTTON

CROSS-REFERENCE TO RELATED PATENT APPLICATIONS

This application is a continuation of U.S. patent application Ser. No. 16/589,738, titled SPRINKLER ASSEMBLY WITH BUTTON, filed Oct. 1, 2019, which claims the benefit of and priority to U.S. Provisional Patent Application Nos. 62/740,243, filed Oct. 2, 2018, 62/740,247, filed Oct. 2, 2018, and 62/740,268, filed Oct. 2, 2018, all of which are incorporated herein by reference in their entireties. This application is related to (i) U.S. patent application Ser. No. 16/589,754, filed Oct. 1, 2019, titled SPRINKLER ASSEMBLY WITH LEVERS, which issued as U.S. Pat. No. 11,253,737 on Feb. 22, 2022, and (ii) U.S. patent application Ser. No. 16/589,798, filed Oct. 1, 2019, titled SPRINKLER ASSEMBLY WITH CAP AND COVER, which issued as U.S. Pat. No. 11,389,681 on Jul. 19, 2022, both of which are incorporated herein by reference in their entireties.

BACKGROUND

Fire suppression sprinkler systems are widely used for fire protection. These systems have sprinklers that are activated in response to an indication that a fire may be nearby (e.g., the ambient temperature in an environment, such as a room or building, exceeds a predetermined value). Once activated, the sprinklers distribute fire-extinguishing fluid, such as water, in the room or building.

SUMMARY

At least one embodiment relates to a sprinkler including a body defining (a) a passage having an inlet configured to be fluidly coupled to a source of fire suppressant fluid, (b) an outlet fluidly coupled to the passage, and (c) a compression pin aperture extending from an outer surface of the body to the passage and configured to receive a compression pin, a button received within the passage, and a seal engaging the button and the body to fluidly seal the inlet from the outlet. The compression pin aperture is positioned such that the compression pin engages the button to force the button against the seal when the compression pin is inserted into the compression pin aperture.

Another embodiment relates to a sprinkler including a body, a button, and a seal. The body defines a passage having an inlet configured to be fluidly coupled to a source of fire suppressant fluid and an outlet fluidly coupled to the passage. The button is positioned within the passage and includes a main body defining an engagement surface and a tail projection extending away from the main body. The seal fluidly seals the inlet from the outlet. The seal has (a) a first sealing surface engaging the body, (b) a second sealing surface opposite the first sealing surface and engaging the engagement surface of the button, and (c) an aperture receiving the tail projection. The aperture is sized such that the seal engages the tail projection, coupling the seal to the button.

Another embodiment relates to a method of manufacturing a sprinkler. The method includes providing a body defining (a) a passage extending along a longitudinal axis between an inlet and an outlet, (b) a seat, and (c) a tooling pin aperture extending from an outer surface of the body to the passage. The method further includes inserting a seal and a button into the passage, the button defining a tooling pin recess. The method further includes orienting the button about the longitudinal axis such that the tooling pin recess aligns with the tooling pin aperture. The method further includes inserting a tooling pin through the tooling pin aperture and into the corresponding tooling pin recess such that the seal is compressed between the seat and the button.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

Fire suppression sprinklers generally include a body with an outlet, an inlet connectable to a source of fire retardant fluid or fire suppressant fluid under pressure, and a deflector supported by the body in a position opposing the outlet for distribution of the fire-extinguishing fluid over a predetermined area to be protected from fire. Individual fire suppression sprinklers may be closed or sealed by a cap. The cap is held in place by a thermally-sensitive element which is released when its temperature is elevated to within a prescribed range (e.g. by the heat from a fire).

Figure 1:
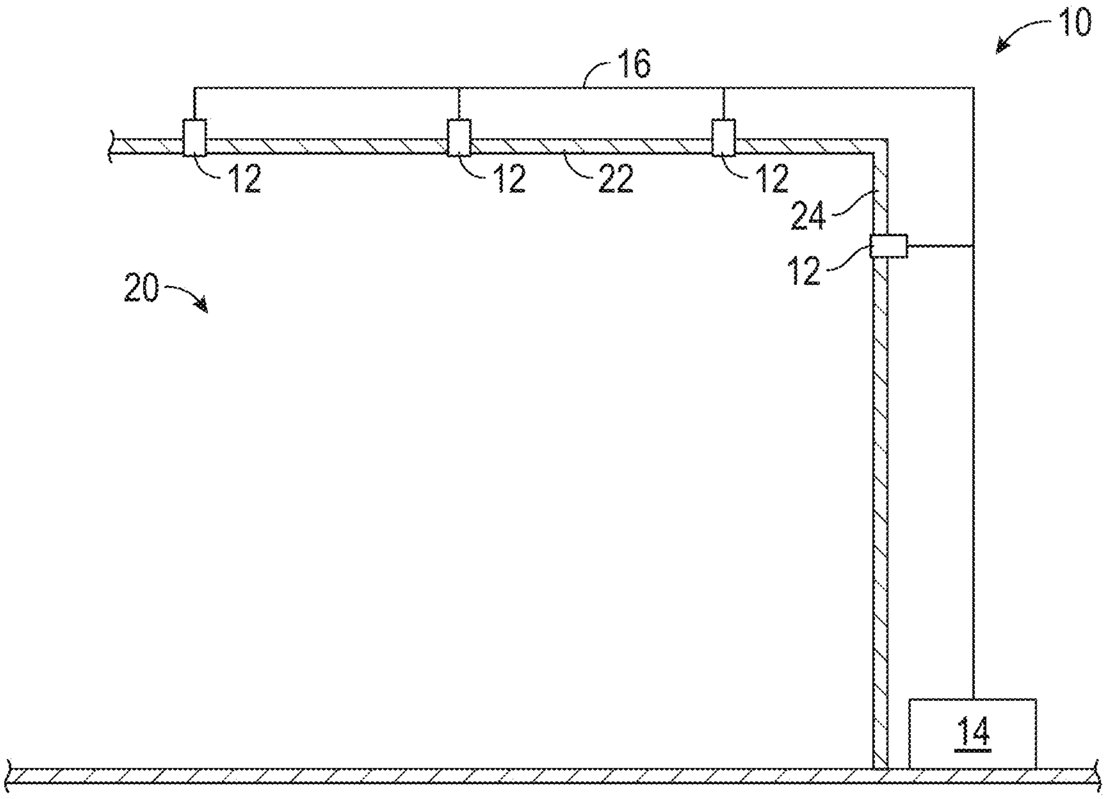
FIG. 1 is a schematic view of a fire suppression system of a building, according to an exemplary embodiment.

Referring to FIG. 1, a fire suppression system 10 of a building is shown according to an exemplary embodiment. The fire suppression system 10 includes a series of sprinklers 12 fluidly coupled to a source 14 of fire suppressant fluid, such as water. The source 14 can include a pump that pressurizes the fire suppressant fluid, a reservoir filled with fire suppressant fluid and positioned atop the building, or another source of pressurized fire suppressant fluid. The sprinklers 12 are fluidly coupled to the source 14 through one or more conduits 16 (e.g., pipes, hoses, etc.). A room 20 of the building can utilize one or more sprinklers 12. In some embodiments, the sprinklers 12 and/or the conduits 16 extend above a ceiling 22 of the room 20 such that the sprinklers 12 and/or the conduits 16 are obscured from view. Additionally or alternatively, the sprinklers 12 may extend into a wall 24 such that the sprinklers 12 and/or conduits 16 are obscured from view. In other embodiments, the sprinklers 12 and/or the conduits 16 are not obscured from view. In the event that a fire occurs within the room 20, the ambient temperature around the sprinklers 12 increases. Once the presence of a fire has been indicated (e.g., by the temperature increasing above a threshold temperature), the sprinklers 12 activate, spreading the fire suppressant fluid throughout the room 20 to contain and/or extinguish the fire.

Some fire sprinklers include components made primarily from metal such as brass. To reduce manufacturing cost, such sprinklers include many relatively simple parts that can be easily produced using common metal forming techniques (e.g., casting, drilling, tapping, stamping, etc.). These components are then assembled together to form the sprinkler assembly.

Figure 2:
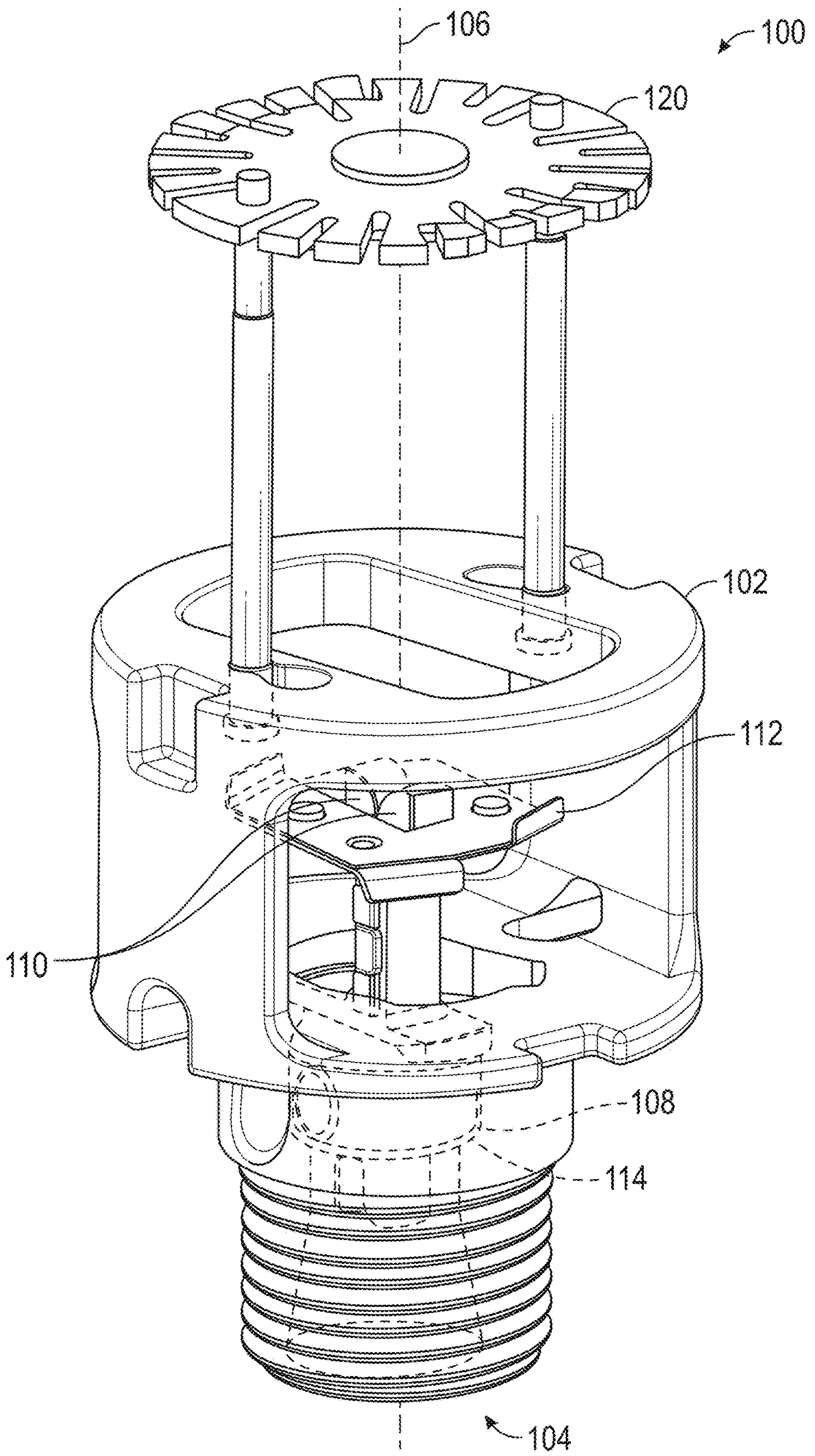
FIG. 2 is a perspective view of a sprinkler, according to an exemplary embodiment.
Figure 3:
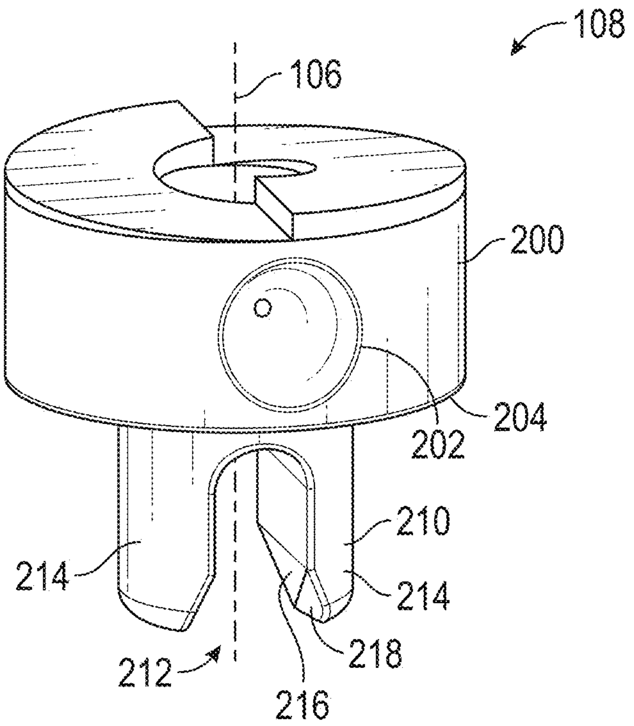
FIGS. 3-5 are perspective views of a button of the sprinkler of FIG. 2, according to an exemplary embodiment.
Figure 4:
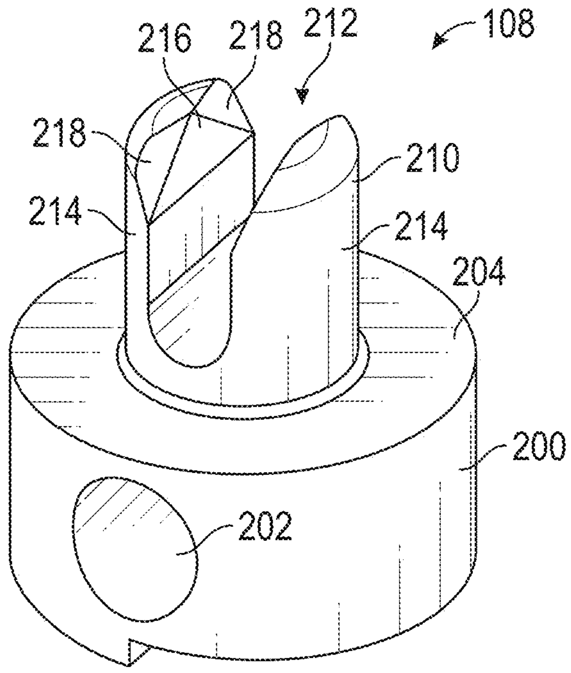
Figure 5:
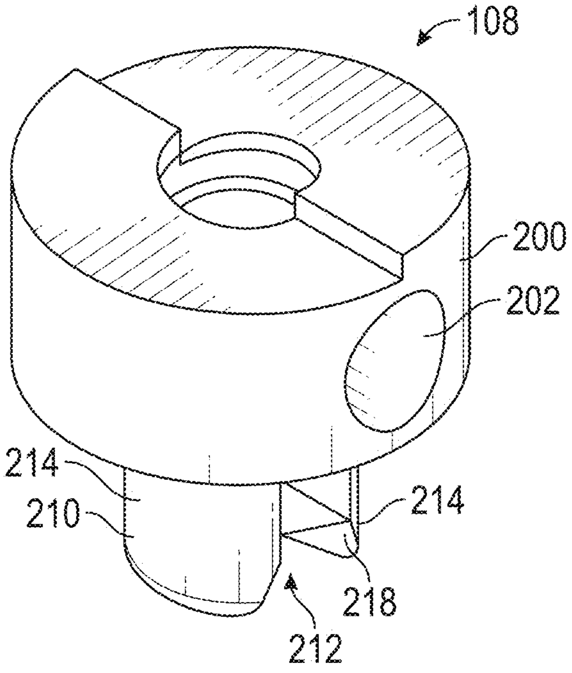
Figure 6:
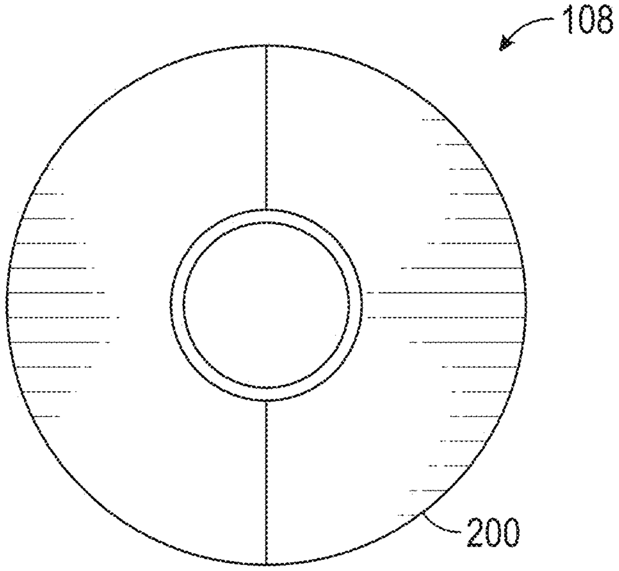
FIG. 6 is a top view of the button of FIG. 3.
Figure 7:
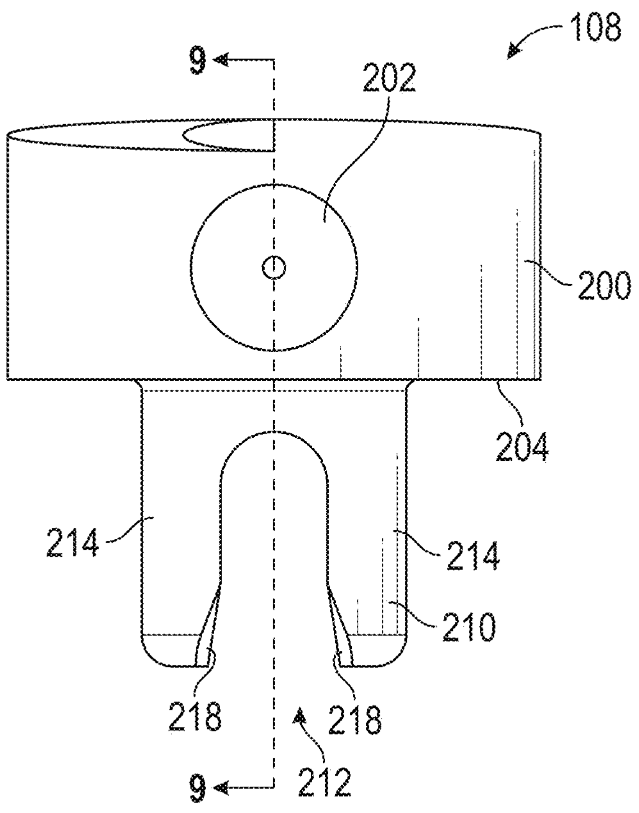
FIG. 7 is a right side view of the button of FIG. 3.
Figure 8:
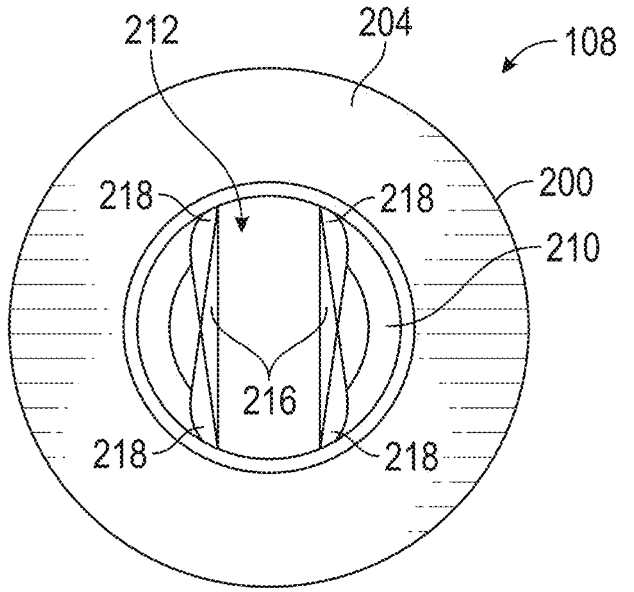
FIG. 8 is a bottom view of the button of FIG. 3.

Referring to FIG. 2, the sprinkler 12 can be a fire sprinkler assembly, shown as sprinkler 100. The sprinkler 100 utilizes multiple components made from a polymeric material. In one embodiment, the polymeric material is glass fiber enforced polyphenylene sulfide (PPS) (e.g., Ryton R-4, Fortron). This material is ideal for a fire sprinkler application as it is strong, corrosion resistant, and has no known solvents below 200 degrees Celsius. The polymeric material may be injection molded to form one or more components. This material is inherently corrosion resistant and accordingly is well suited to prolonged contact with water or other types of fire-suppressants. Additionally, because the polymeric material can be injection molded, the components can be made to have a complex geometry quickly, easily, and at a low cost. Because of this, the sprinkler 100 can have a reduced part count relative to a metal sprinkler, reducing the costs and complexity of the assembly process. Injection molding of the components reduces the number of operations and associated pieces of equipment required to manufacture the sprinkler 100, thereby reducing the manufacturing costs and floor space required to manufacture the sprinkler 100.

In other embodiments, a different type of polymeric material is used. By way of example, other suitable polymeric materials may include: polyetheretherketone (PEEK); polyphthalamide (PPA) (e.g., Amodel, Ultramid); polyetherketoneketone (PEKK); polyimide (TPI) (e.g., Vespel); polyamide 6, 66, and 12 (PA6, PA66, and PA12) (e.g., Nylon, Zytel, long fiber Celstran); polysulfone (PSU); polyethersulfone (PES); polyetherimide (PEI) (e.g., Ultem); and polyamide-imide (PAI) (e.g., Torlon). Some such materials may be activated by heat curing after injection molding to further strengthen the components. Any of the polymers discussed herein may be reinforced (e.g., filled) with glass fibers, carbon fibers, aramid fibers, mica fibers, or other types of fibers. In yet other embodiments, some or all of the components are formed using a non-polymeric material such as metal (e.g., brass, stainless steel, etc.).

The sprinkler 100 includes a sprinkler body (e.g., a housing, a frame, etc.), shown as body 102, that defines an aperture, shown as inlet 104, configured to be fluidly coupled to the source 14 (e.g., through the conduit 16). The body 102 extends away from the inlet 104 along a longitudinal axis 106. A cap, plug, stopper, brace, or member, shown as button 108, is held in place by a pair of levers, shown as lever arms 110. The lever arms 110 are held against one another by a destructible assembly, shown as fusible link 112. Together, the lever arms 110 and the fusible link 112 act as an activation assembly that controls activation of the sprinkler 100. When the sprinkler 100 is fully assembled, the lever arms 110 engage the body 102 and push against the button 108. The button 108 in turn pushes a conical spring seal, shown as spring seal 114, against the body 102. The spring seal 114 seals the inlet 104, preventing the fire suppressant fluid from escaping the sprinkler 100. When a heat source causes the temperature of the fusible link 112 to increase above a threshold temperature, the fusible link 112 comes apart. This permits the lever arms 110 to separate from one another and loosens the button 108 and the spring seal 114. The pressure of the fire suppressant fluid pushes against the button 108 and the spring seal 114, forcing the button 108, the lever arms 110, and the spring seal 114 out of the body 102, and the fire suppressant fluid is released from the sprinkler 100 into the surroundings. The sprinkler 100 further includes a deflector assembly, shown as deflector 120, coupled to the body 102. The deflector 120 is positioned such that the fire suppressant fluid strikes the deflector 120 immediately prior to leaving the sprinkler 100, spreading the fluid over a larger area.

In other embodiments, one or more of the lever arms 110 and the fusible link 112 are omitted, and the sprinkler 100 includes a different type of activation element or activation assembly. The activation assembly may include a temperature-sensitive frangible bulb that shatters upon reaching a threshold temperature, activating the sprinkler 100. The activation assembly may include a shape memory alloy that changes shape upon reaching a threshold temperature, activating the sprinkler. The activation assembly may include an electric actuator that is configured to activate the sprinkler. The electric actuator may be coupled to a controller that uses an input from a sensor to determine if a threshold temperature has been reached and subsequently activates the electric actuator.

In FIG. 2, the sprinkler 100 is shown with the deflector 120 positioned above the body 102. It should be understood that the orientations of the components shown herein may be chosen to facilitate showing certain features, and these orientations may not represent the orientations of the components after installation and/or during operation. By way of example, once installed, the deflector 120 may be positioned below the body 102.

Figure 9:
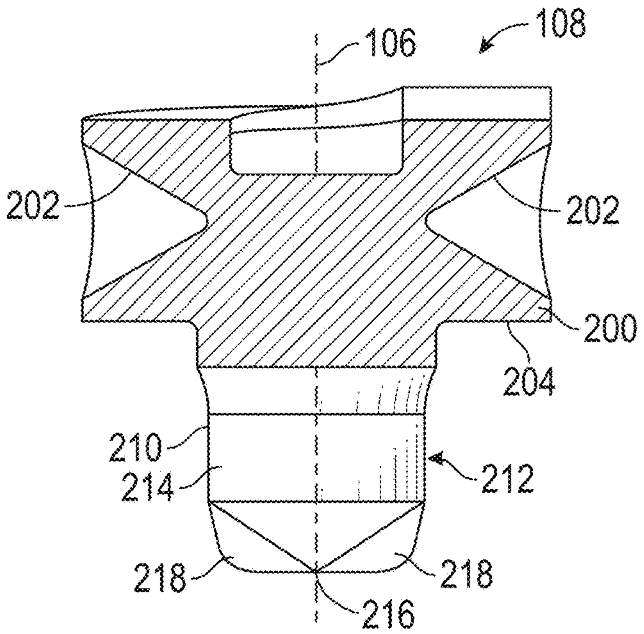
FIG. 9 is a front side section view of the button of FIG. 3.
Figure 10:
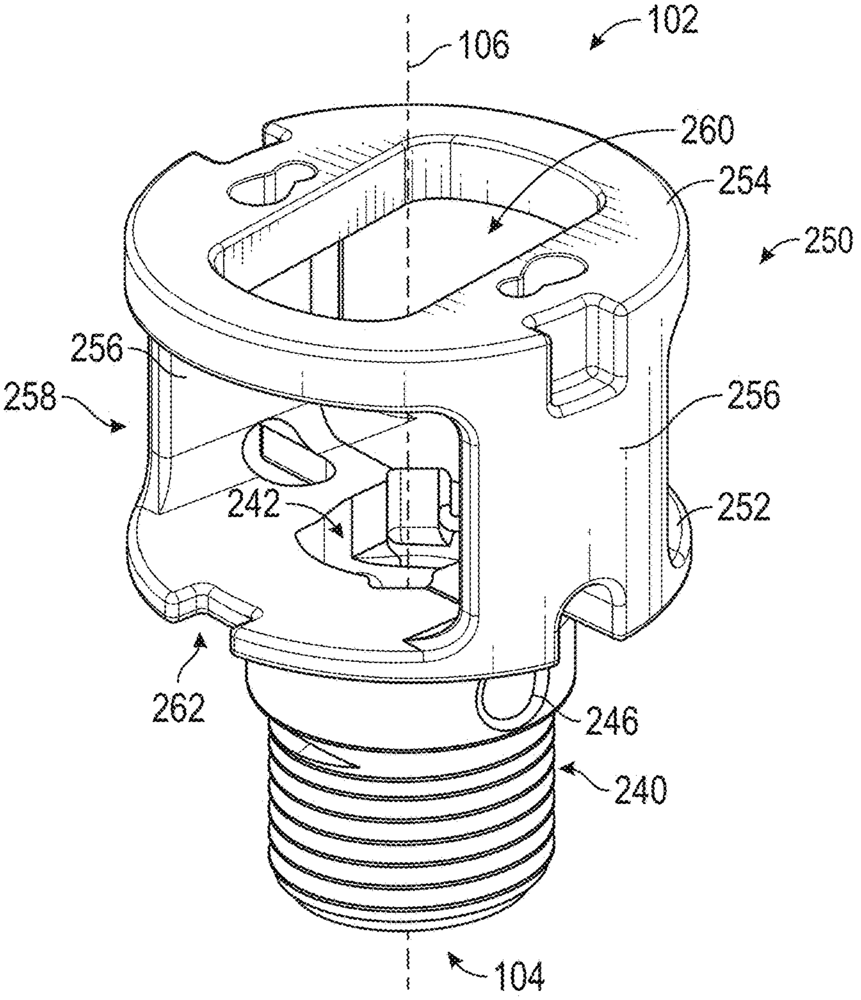
FIG. 10 is a perspective view of a body of the sprinkler of FIG. 2, according to an exemplary embodiment.
Figure 11:
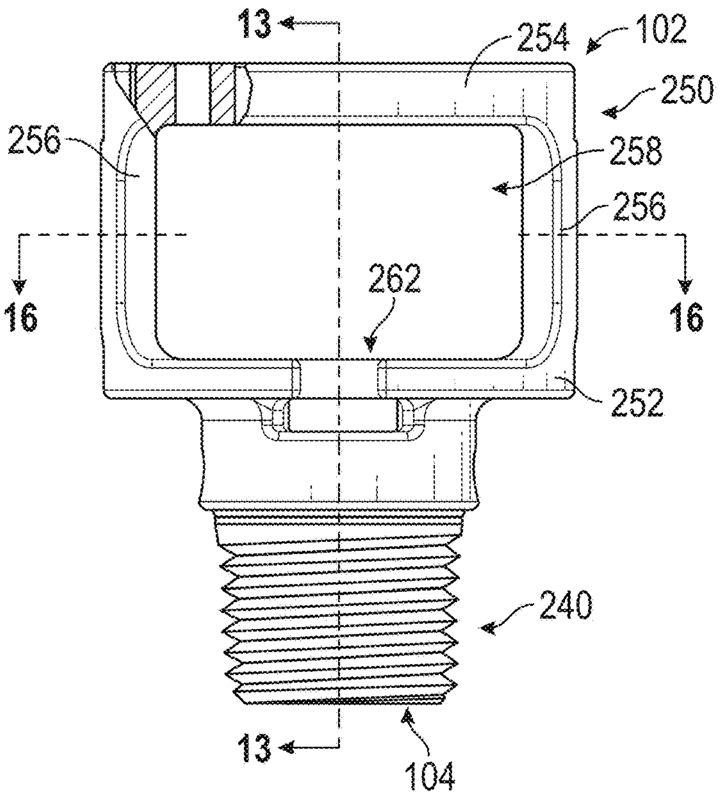
FIG. 11 is a partial front side section view of the body of FIG. 10.
Figure 12:
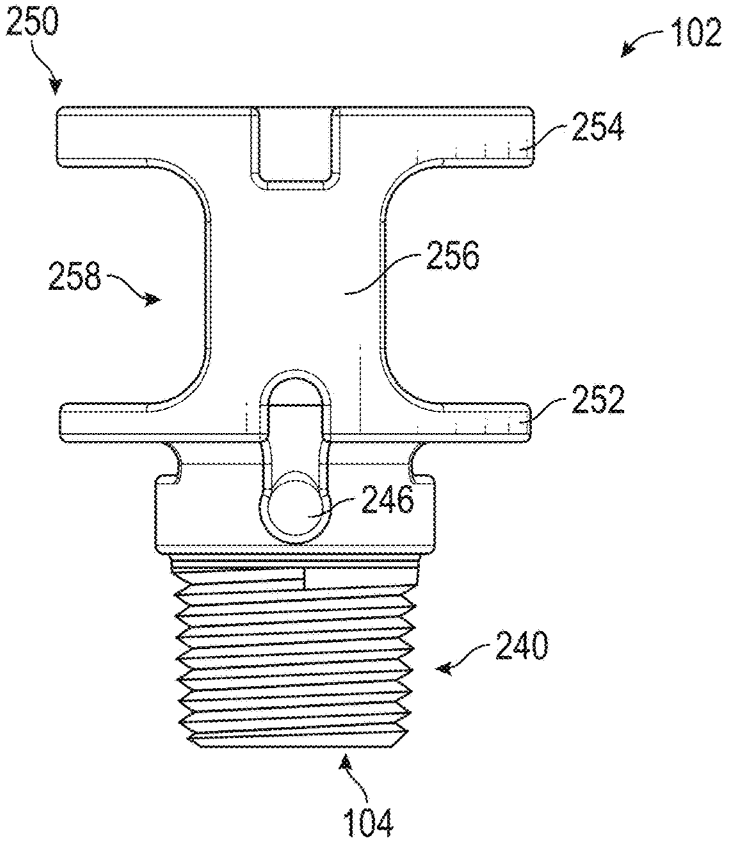
FIG. 12 is right a side view of the body of FIG. 10.

Referring now to FIGS. 3-9, the button 108 is shown according to an exemplary embodiment. In this embodiment, the button 108 is injection molded as a single piece from polymeric material. The button 108 includes a central body, shown as main body 200. The main body 200 is cylindrical and extends along the longitudinal axis 106. A pair of recesses (e.g., tooling pin recesses, compression pin recesses, etc.), shown as compression pin recesses 202, extend radially inward from the circumference of the main body 200. As shown in FIG. 9, the compression pin recesses 202 are substantially conical. The compression pin recesses 202 are diametrically opposed (e.g., on opposing sides of the longitudinal axis 106, offset 180 degrees from one another). The main body 200 also defines a surface, shown as seal engagement surface 204. The seal engagement surface 204 extends perpendicular to the longitudinal axis 106 and is configured to engage the spring seal 114.

A protrusion or projection, shown as tail 210, extends away from the main body 200 along the longitudinal axis 106. The tail 210 is positioned on the same side of the main body 200 as the seal engagement surface 204 such that the seal engagement surface 204 surrounds the tail 210. An alignment feature (e.g., a protrusion, stud, surface, slot, groove, recess, etc.), shown as slot 212, extends through the tail 210, splitting the tail 210 into a pair of sections 214. The slot 212 extends partway along the length of the tail 210 (e.g., parallel to the longitudinal axis 106) and across the entire width of the tail 210 (e.g., perpendicular to the longitudinal axis 106). Each section 214 defines a first alignment surface 216 and a pair of second alignment surfaces 218. The first alignment surface 216 is positioned between the second alignment surfaces 218. The first alignment surface 216 is angled relative to the longitudinal axis 106, and the second alignment surfaces 218 are each angled relative to both the longitudinal axis 106 and the corresponding first alignment surface 216. The first alignment surfaces 216 and the second alignment surfaces 218 effectively increase a thickness of the slot 212 at the end of the slot 212 farthest from the main body 200. Accordingly, as the slot 212 extends toward the main body 200, the slot 212 gradually decreases in thickness, then stays substantially constant.

Referring to FIGS. 10-16, the body 102 is shown according to an exemplary embodiment. In this embodiment, the body 102 is injection molded as a single piece from polymeric material. The body 102 includes a first section, shown as neck portion 240. The neck portion extends along and is substantially centered about the longitudinal axis 106. As shown, the neck portion 240 is threaded (e.g., with tapered threads, with NPT threads, etc.) to facilitate sealing engagement with the conduit 16 that provides the sprinkler 100 with a supply of pressurized fire suppressant fluid. In other embodiments, the neck portion 240 is otherwise coupled to the conduit 16 (e.g., through a quick-disconnect fitting, through a fitting having straight threads and a gasket, through a flared fitting, through a grooved coupling, through a compression fitting, etc.).

Figure 13:
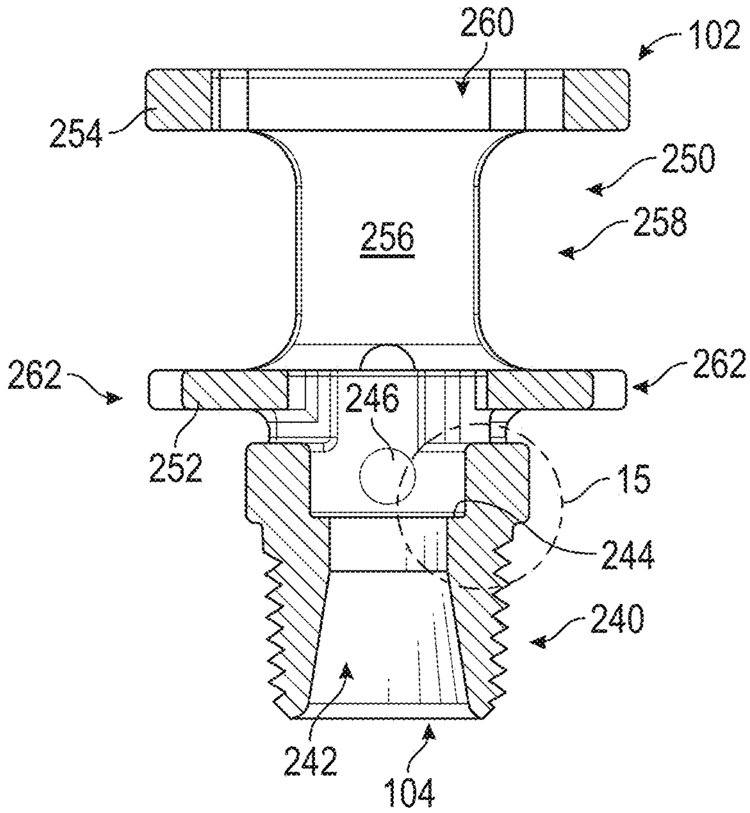
FIG. 13 is a right side section view of the body of FIG. 10.
Figure 14:
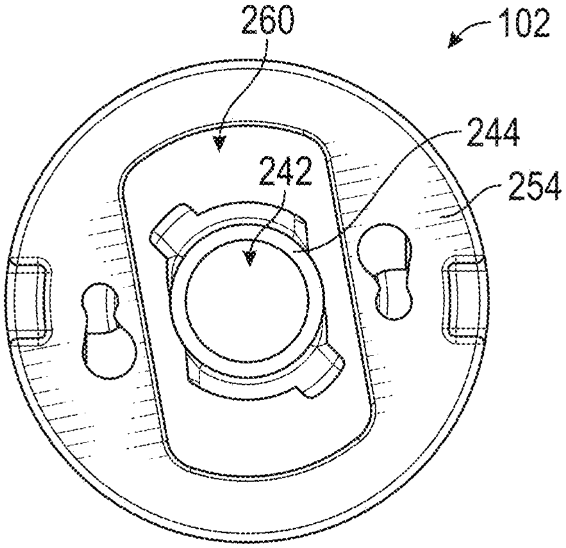
FIG. 14 is a top view of the body of FIG. 10.
Figure 15:
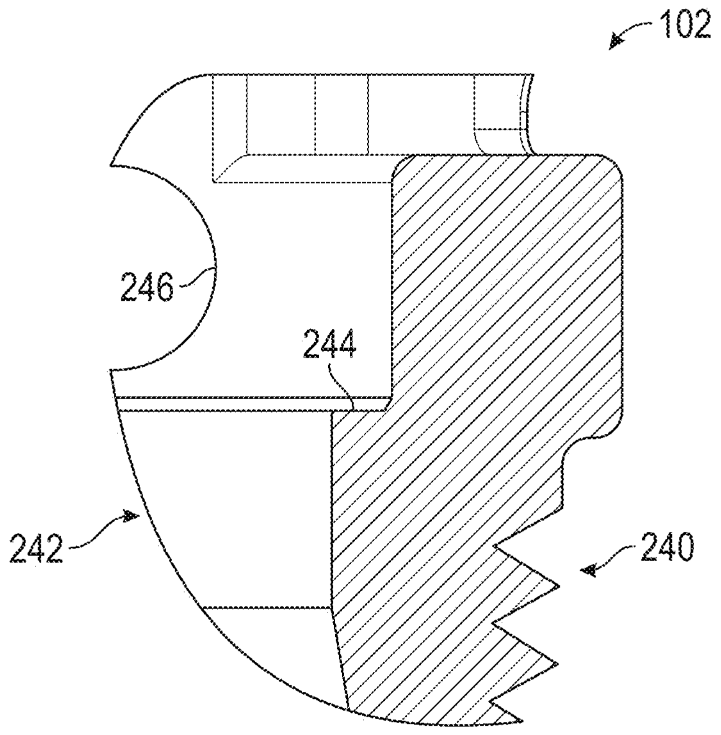
FIG. 15 is a right detail section view of the body of FIG. 10.
Figure 16:
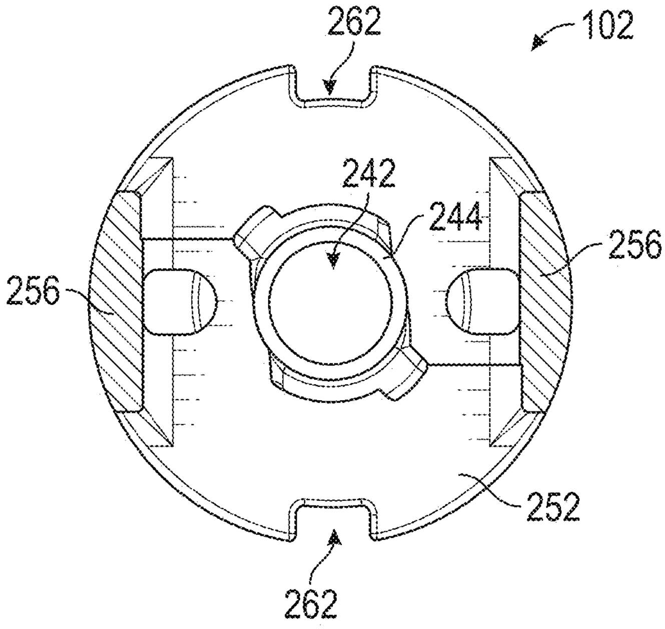
FIG. 16 is a top section view of the body of FIG. 10.

The neck portion 240 defines a passage 242 extending along and centered about the longitudinal axis 106. The passage 242 begins at the inlet 104 and extends toward the opposite end of the body 102. As shown in FIGS. 13 and 15, the passage 242 gradually decreases in cross-sectional area as it extends away from the inlet 104, then sharply increases in cross-sectional area to define a seat, step, or shoulder, shown as shoulder 244. The shoulder 244 is annular and extends substantially perpendicular to the longitudinal axis 106. A pair of apertures (e.g., tooling pin apertures, compression pin apertures, etc.), shown as compression pin apertures 246, extend from an outer surface of the neck portion 240 to the passage 242. The compression pin apertures 246 are diametrically opposed. The compression pin apertures 246 are substantially circular. The compression pin apertures 246 extend substantially perpendicular to the longitudinal axis 106.

The body 102 further includes a second section, shown as cage portion 250, fixedly coupled (e.g., integrally formed with) the neck portion 240. The cage portion 250 is substantially cylindrical and also extends along and is substantially centered about the longitudinal axis 106. The cage portion 250 extends farther radially outward from the longitudinal axis 106 than the neck portion 240 (e.g., has a larger radius than the neck portion 240). The cage portion 250 includes two disk-shaped plates or members, shown as middle disk 252 and outer disk 254, each extending substantially perpendicular to the longitudinal axis 106. The middle disk 252 extends adjacent the neck portion 240, and the outer disk 254 is longitudinally offset from the middle disk 252. A pair of longitudinal members, shown as supports 256, extend directly between and couple the middle disk 252 and the outer disk 254. The supports 256 are diametrically opposed and extend substantially parallel to the longitudinal axis 106. A passage, shown as access passage 258, extends substantially perpendicular to the longitudinal axis 106 and the compression pin apertures 246 though the cage portion 250. Specifically, the access passage 258 extends between the middle disk 252, the outer disk 254, and the supports 256. The passage 242 intersects the access passage 258. The access passage 258 facilitates access to the passage 242 from the side of the body 102 opposite the inlet 104 (e.g., during assembly). The outer disk 254 defines an aperture, shown as outlet 260, extending therethrough. The outlet 260 is substantially centered about the longitudinal axis 106. The outlet 260 intersects the access passage 258. Accordingly, the inlet 104 is fluidly coupled to the outlet 260 in certain configurations of the sprinkler 100 (e.g., when the button 108 is removed from the sprinkler 100). The middle disk 252 defines a pair of alignment features (e.g., protrusions, surfaces, recesses, apertures, notches, slots, grooves, etc.), shown as alignment notches 262. The alignment notches 262 are diametrically opposed and offset 90 degrees from the compression pin apertures 246.

Figure 17:
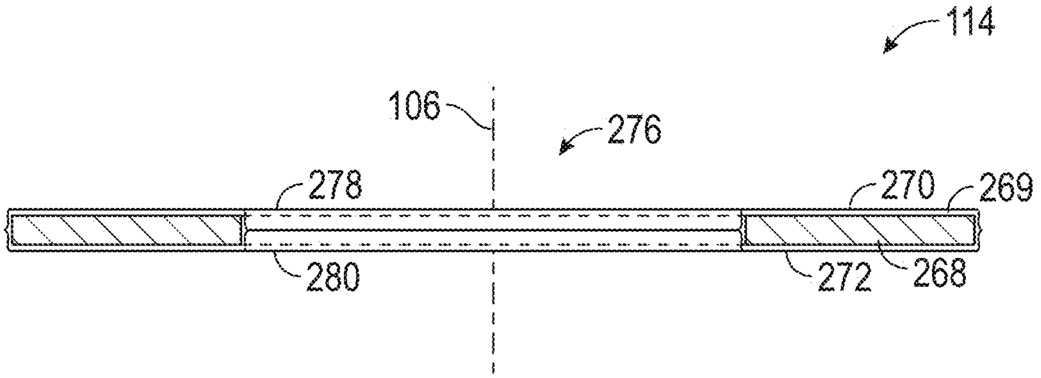
FIG. 17 is a front side section view of a conical spring seal of the sprinkler of FIG. 2 in a fully compressed state, according to an exemplary embodiment.
Figure 18:
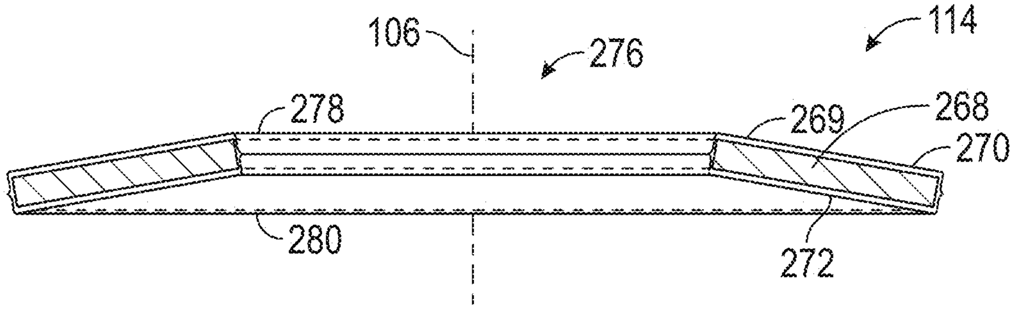
FIG. 18 is a front side section view of the conical spring seal of FIG. 17 in a free state.

Referring to FIGS. 17 and 18, the spring seal 114 is shown according to an exemplary embodiment. The spring seal 114 is a type of spring seal configured to be compressed between two flat engagement surfaces, thereby preventing fluid from flowing between the two engagement surfaces. The spring seal 114 includes an annular spring base 268 formed from a piece of spring material (e.g., spring steel, etc.) that is covered in a layer of flexible coating 269 (e.g., PTFE, Teflon, etc.) that facilitates sealing. When the spring seal 114 is compressed, the flexible coating 269 may conform to the shape of the components that it contacts, further increasing the sealing performance of the spring seal 114. The spring seal 114 defines two opposing sealing surfaces: a sealing surface 270 and a sealing surface 272. In some embodiments, the sealing surface 270 and the sealing surface 272 extend substantially parallel to one another. The spring seal 114 is annular such that the sealing surface 270 and the sealing surface 272 are both annular. The spring seal 114 defines an aperture, shown as central aperture 276, positioned at the center of the spring seal 114. Once the sprinkler 100 is assembled, the longitudinal axis 106 extends through the center of the spring seal 114.

In normal operation, the spring seal 114 is compressed to move between two states or configurations: an uncompressed, relaxed, or free state shown in FIG. 18, and a fully compressed state shown in FIG. 17. In the relaxed state, the sealing surface 270 and the sealing surface 272 are substantially frustoconical and oriented at an angle between 0 and 90 degrees relative to the longitudinal axis 106. In the fully compressed state, the sealing surface 270 and the sealing surface 272 are substantially flat and oriented substantially perpendicular to the longitudinal axis 106. When placed between two flat engagement surfaces, a first edge, shown as edge 278, engages the first flat engagement surface, and a second edge, shown as edge 280, engages the second engagement surface. The edge 278 is located on the sealing surface 270 and adjacent the central aperture 276. The edge 280 is located on the sealing surface 272 and opposite the central aperture 276. As the spring seal 114 is compressed, the sealing surfaces 270 and 272 flatten until the spring seal 114 reaches the fully compressed state. In the fully compressed state, the spring seal 114 provides peak sealing performance. Deforming the spring seal 114 beyond the fully compressed state (e.g., such that the sealing surfaces 270 and 272 become angled in the opposite direction) overextends the spring seal 114 which can cause it to permanently deform and no longer seal properly.

FIGS. 19-22 illustrate a method 300 of assembling the sprinkler 100. Specifically, FIGS. 19-22 illustrate the process of assembling the body 102, the button 108, and the spring seal 114 together. In step 302 of the method 300, the tail 210 of the button 108 is inserted into the central aperture 276 of the spring seal 114. Once inserted, the edge 278 of the sealing surface 270 engages the seal engagement surface 204. The flexible coating 269 and the central aperture 276 are sized such that the flexible coating 269 is deformed by the tail 210, pressing against the tail 210 and removably coupling the spring seal 114 to the button 108. This facilitates assembly without the spring seal 114 falling off of the button 108. In step 304 of the method 300, the subassembly including the button 108 and the spring seal 114 is placed into the passage 242 such that the edge 280 of the sealing surface 272 engages the shoulder 244. At this point, the button 108 and the spring seal 114 are roughly aligned with the longitudinal axis 106 through contact with the walls of the passage 242.

Figure 23:
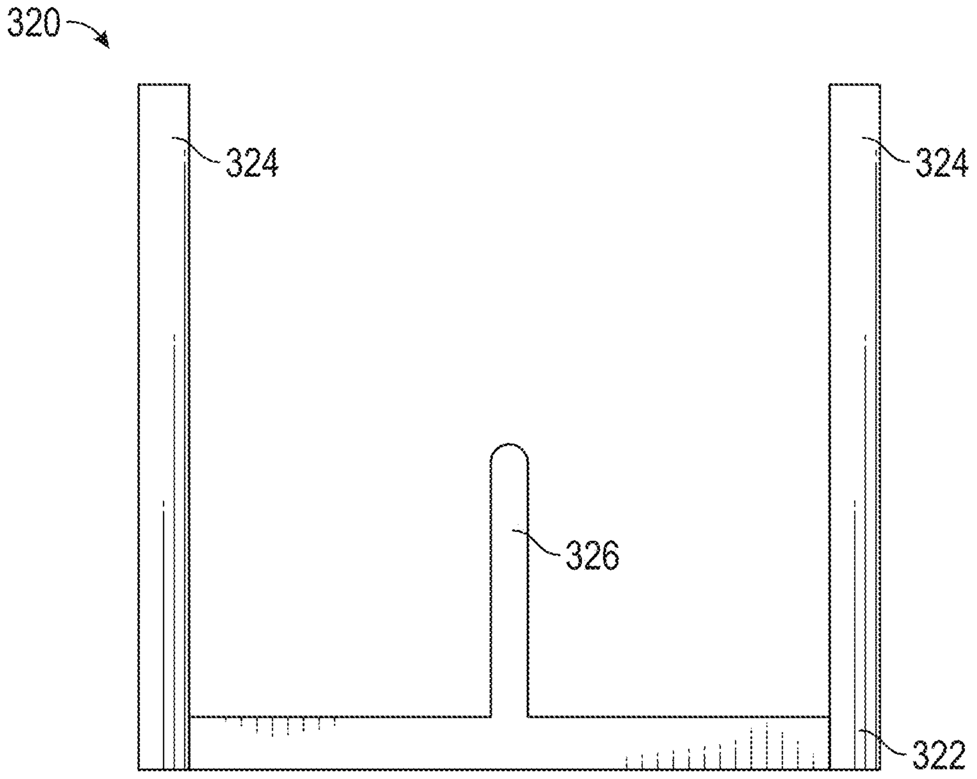
FIG. 23 is a front side view of an alignment device for use when assembling the sprinkler of FIG. 2, according to an exemplary embodiment.
Figure 24:
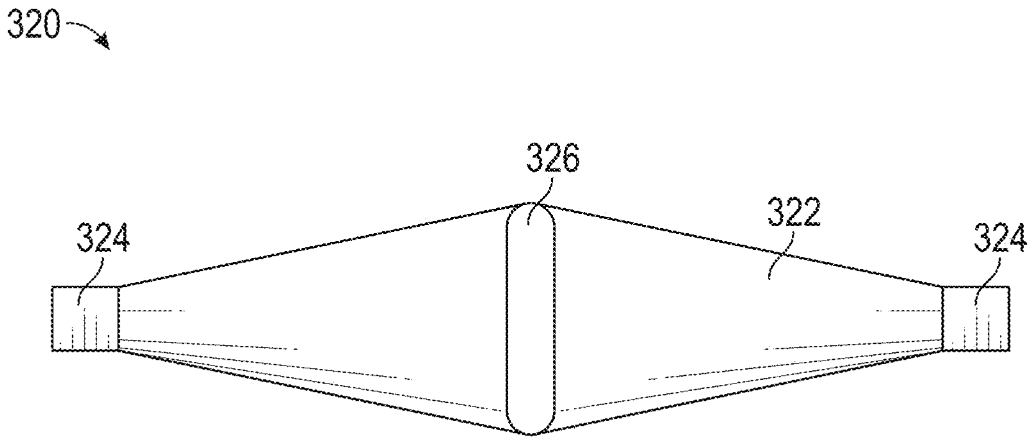
FIG. 24 is a top view of the alignment device of FIG. 23.

In step 306 of the method 300, the button 108 is oriented within the passage 242. Specifically, the button 108 is rotated about the longitudinal axis 106 until the compression pin recesses 202 align with the compression pin apertures 246. The button 108 is symmetrical such that it functions identically in two different aligned orientations, each offset from one another by 180 degrees. Similarly, the body 102 is also symmetrical such that it functions identically in two different aligned orientations, each offset from one another by 180 degrees. To facilitate proper alignment of the button 108, a fixture, alignment tool, or alignment device, shown in FIGS. 23 and 24 as alignment device 320, is used. The alignment device 320 includes a main body, shown as frame 322. Although the frame 322 is shown as generally having a "U" shape, it should be understood that the shape of the frame 322 can change between different embodiments. A pair of projections or protrusions, shown as alignment features 324, extend upward from the frame 322. The alignment features 324 have a shape, size, and spacing corresponding to that of the alignment notches 262. Another projection or protrusion, shown as alignment feature 326, extends upward from the frame 322. The alignment feature 326 is centered between the alignment features 324. The alignment feature 326 is sized and shaped to correspond with the slot 212 of the button 108. In some embodiments, the alignment feature 326 is sized and shaped to correspond with the passage 242 such that the alignment feature 326 is centered within the passage 242 by engagement with the body 102.

In use, the alignment device 320 orients the button 108 relative to the body 102. The alignment device 320 is moved onto the body 102 such that the alignment feature 326 is received within the passage 242 and the alignment features 324 are received within the alignment notches 262. Contact between the alignment features 324 and the middle disk 252 and between the alignment feature 326 and the neck portion 240 orients the body 102 relative to the alignment device 320. In other embodiments, an alignment feature of the alignment device 320 engages the outer surface of the neck portion 240 to align the alignment device 320. If the button 108 is properly aligned, the slot 212 receives the alignment feature 326. If the button 108 is slightly off of the desired alignment, the first alignment surface 216 and the second alignment surface 218 engage the alignment feature 326. The orientation of the first alignment surface 216 and the second alignment surface 218 causes the button 108 to rotate into alignment such that the alignment feature 326 is fully received within the slot 212. If the button 108 is even further out of alignment (e.g., 90 degrees out of alignment), then the button 108 will be held away from the inlet 104 due to contact with the alignment device 320. Upon seeing that the button 108 is not fully seated, the operator can rotate the button 108 until the slot 212 aligns with the alignment feature 326. The button 108 will then drop back down until the spring seal 114 engages the shoulder 244. The alignment feature 326 has a width greater than the thickness of the slot 212. Accordingly, once the alignment feature 326 is received within the slot 212, the button 108 is prevented from rotating out of the desired alignment. The alignment device 320 may be engaged with the body 102 prior to insertion of the button 108 and the spring seal 114 into the passage 242 or after insertion of the button 108 and the spring seal 114.

Figure 19:
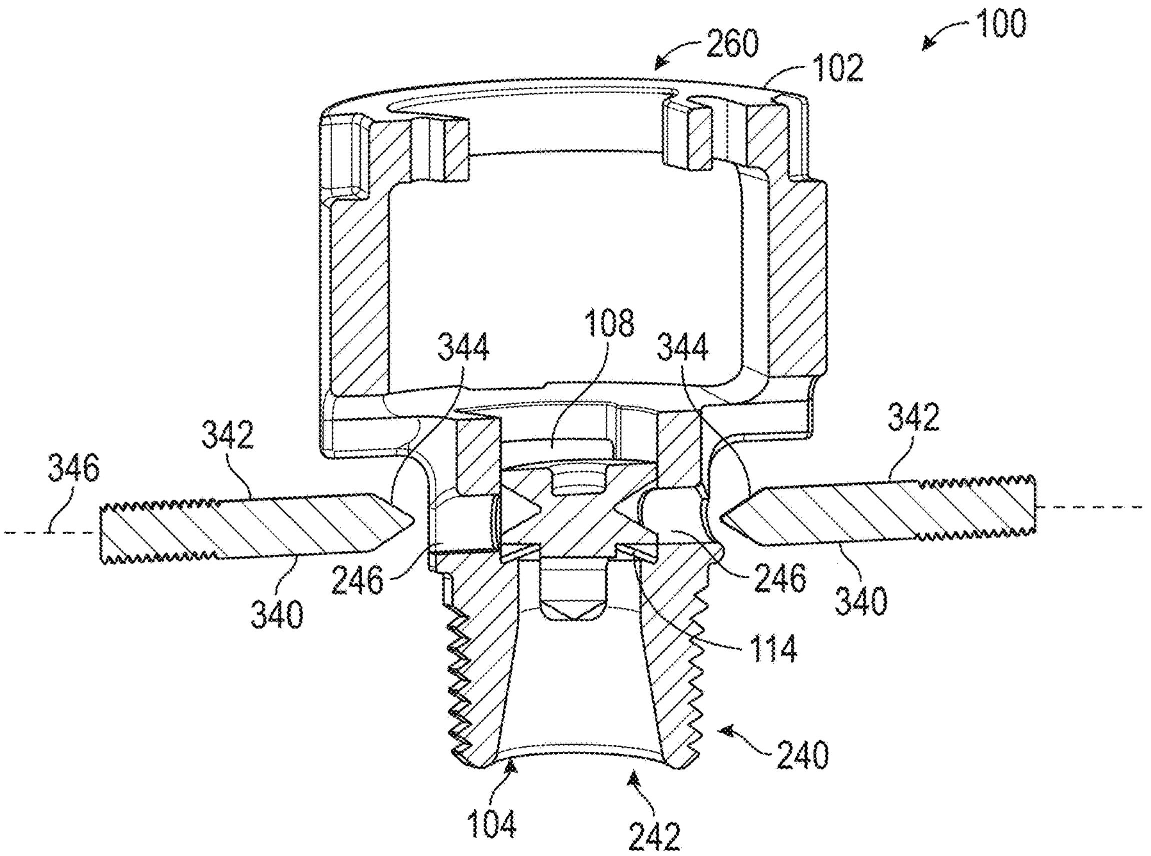
FIGS. 19-21 are front section views of the sprinkler of FIG. 2.
Figure 20:
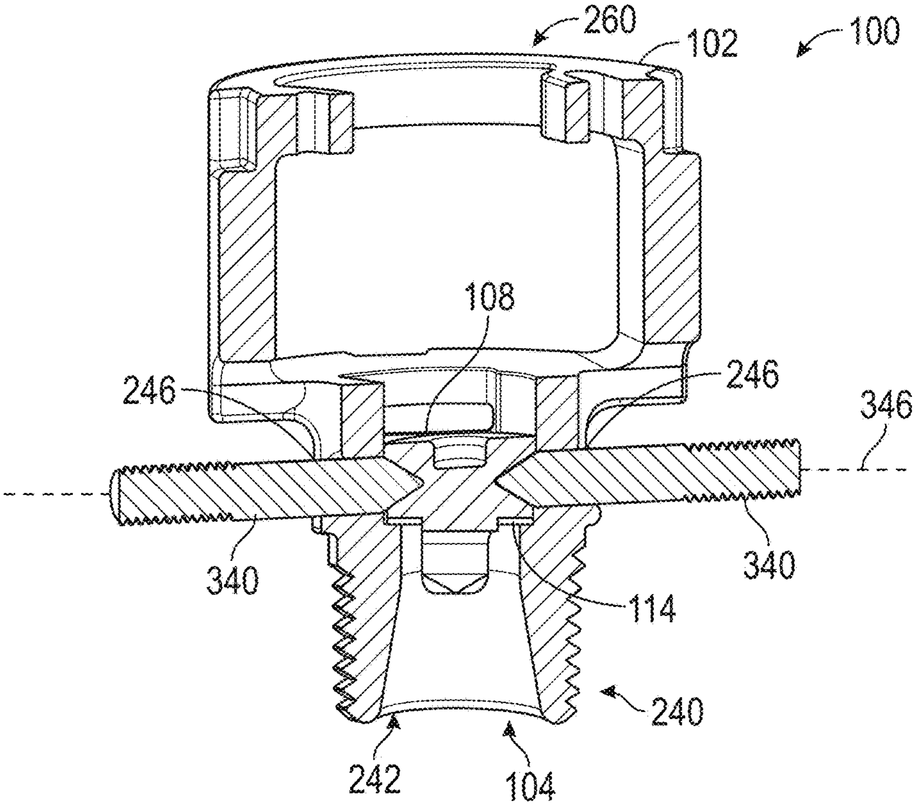
Figure 21:
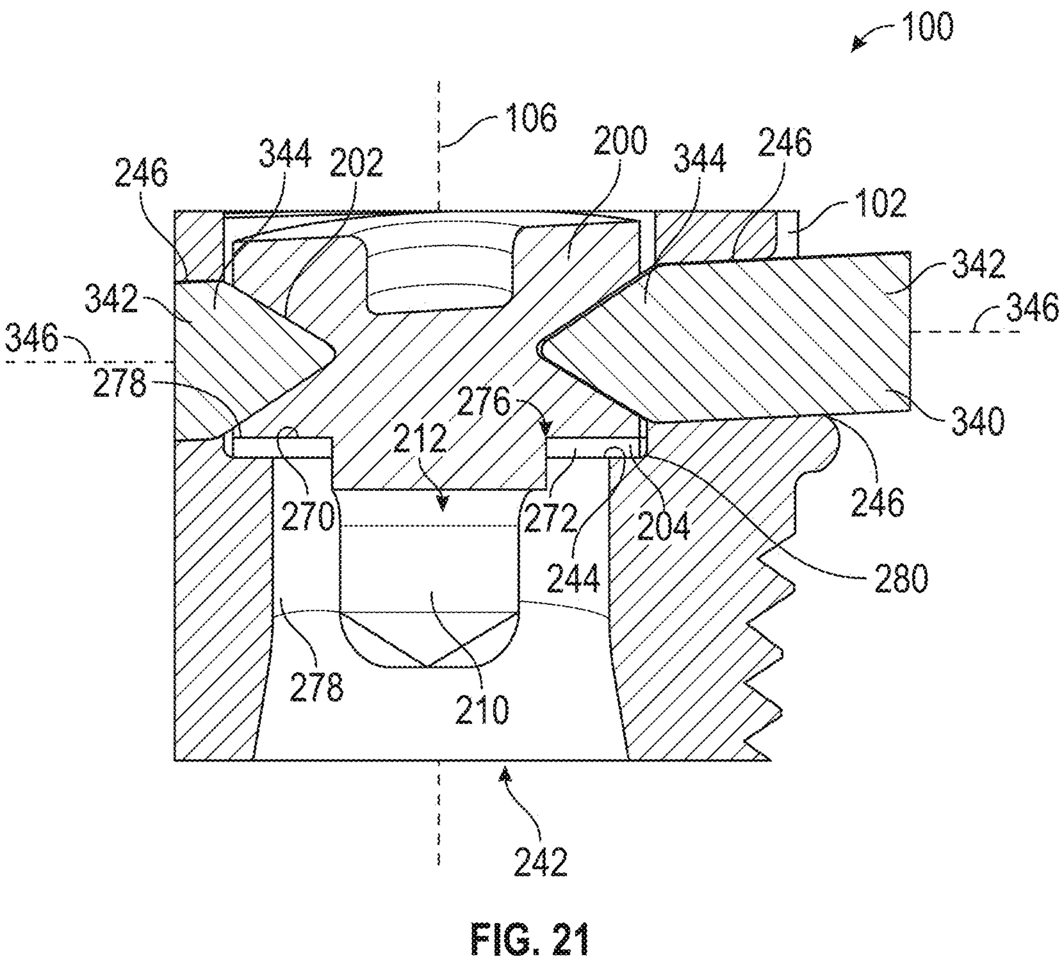
Figure 22:
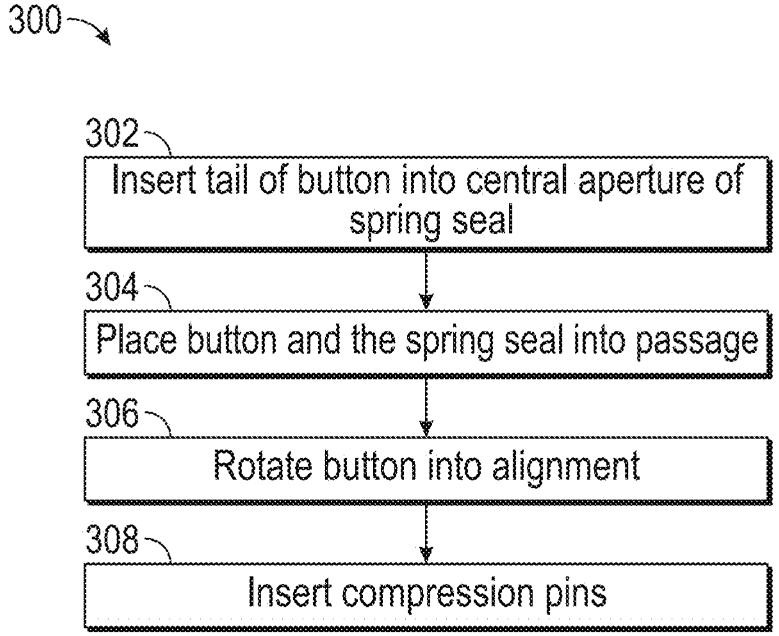
FIG. 22 is a block diagram illustrating a method of assembling a sprinkler, according to an exemplary embodiment.

Referring to FIGS. 19-21, once the button 108 is aligned, in step 308 of the method 300, a pair of pins (e.g., tooling pins, compression pins, etc.), shown as compression pins 340 are inserted into the compression pin apertures 246. The compression pins 340 each have a shaft 342 that is cylindrical and an end portion, shown as alignment tip 344, that is substantially conical. The compression pins 340 are substantially radially symmetric about a compression pin axis, shown as axis 346. The shafts 342 have slightly smaller diameters than the compression pin apertures 246. This fit may facilitate smooth passage of the compression pins 340 through the compression pin apertures 246 while still ensuring that the body 102 fully supports the compression pins 340. Accordingly, once the shafts 342 are received within the compression pin apertures 246, each compression pin 340 is only free to rotate about its respective axis 346 and translate along its respective axis 346.

The compression pins 340 can be coupled to a clamp or other device that controls the relative distance between the compression pins 340. Once the compression pins 340 are received within the compression pin apertures 246, a force is applied to the compression pins 340 to move them toward one another (e.g., toward the longitudinal axis 106). The compression pins 340 move toward the longitudinal axis 106 until the alignment tip 344 engages the surface of the corresponding compression pin recess 202. Because both the compression pin recess 202 and the alignment tip 344 are substantially conical, applying further force to the compression pins 340 forces the compression pin recess 202 into alignment with the axis 346. This controls the longitudinal position of the button 108. As shown in FIG. 19, without the force of the compression pins 340, the spring seal 114 remains in the free state. As the compression pins 340 push on the button 108, the button 108 is forced toward the inlet 104, compressing the spring seal 114. As shown in FIGS. 20 and 21, when the compression pins 340 are fully seated within the compression pin recesses 202, the spring seal 114 is in the fully compressed state. In this state, the entirety of the sealing surface 270 sits flat against the seal engagement surface 204 of the button 108, and a full circular section of the sealing surface 272 sits flat against the shoulder 244. Accordingly, the spring seal 114 and the button 108 cooperate to fluidly decouple the inlet 104 from the access passage 258 and the outlet 260. In this state, if pressurized fire suppressant fluid were to be provided at the inlet 104, the fluid would remain in the passage 242 and not exit the sprinkler 100. The compression pins 340 can remain in this position throughout later stages of assembly (e.g., insertion of the lever arms 110). After assembly of the sprinkler 100 is complete, the compression pins 340 can be removed by simply pulling them out of the body 102. The button 108 is then held in this position by the lever arms 110 until the fusible link 112 separates and the sprinkler 100 is activated (e.g., by a fire).

In other embodiments, the shapes of the compression pin recesses 202 and/or the alignment tips 344 are modified. Generally, one or both of the compression pin recesses 202 and the alignment tips 344 have a surface that is angled relative to the axis 346 (e.g., a conical surface, a tapered surface, a triangular cross-section, etc.) such that movement of the compression pins 340 along the axis 346 and toward the longitudinal axis 106 causes a corresponding movement of the main body 200 along the longitudinal axis 106. By way of example, the compression pin recesses 202 may be replaced with an annular triangular groove that extends around the circumference of the main body 200 to receive the alignment tips 344. By way of another example, the conical surfaces of the alignment tips 344 may be replaced with flat wedge shapes that are inserted into the compression pin recesses 202. By way of another example, the compression pin recesses 202 may be omitted, and the alignment tips 344 may engage a top surface of the main body 200. By way of yet another example, the alignment tips 344 may have non-angled surfaces (e.g., a flat surface that is perpendicular to the axis 346) that engage angled surfaces of the compression pin recesses 202.

In an alternative embodiment, the button 108 includes a threaded feature that is configured to engage a fixture to hold the button 108 in place. By way of example, the button 108 may include a blind threaded hole that is configured to receive a fastener. The fastener may extend out of the passage 242 and engage a fixture that in turn engages the body 102. The fastener may then be tightened to impart a force on the button 108, holding the button in place.

During assembly of some sprinklers, a button is held in place by a device that pushes (a) directly on a surface of the button opposite the inlet of the sprinkler or (b) directly on an activating member that is in contact with the button (e.g., the levers, the fusible link, a bulb, etc.), both of which have a number of disadvantages when compared to the sprinkler 100. This device extends between the button and an outlet of the sprinkler, obstructing access to the button during later stages of assembly. The compression pins 340 of the sprinkler 100 extend laterally from the button 108 and do not restrict access to access the access passage 258 or the outlet 260.

Additionally, other methods of assembling a sprinkler involve applying force on the button regardless of its longitudinal position. The longitudinal position range for the fully compressed state of a conical spring seal is only a few thousandths of an inch; if the spring seal is outside of this range, it will not seal properly. If the force on the button is not controlled precisely, the button can move too close to the inlet, overextending the spring seal and permanently deforming it (e.g., inverting it). After this, the spring seal must be removed from the sprinkler and replaced or the spring seal will not seal properly and the sprinkler will leak. Alternatively, if insufficient force is applied to the spring seal, the seal will not compress enough and thus will not seal properly. The compression pins 340 of the sprinkler 100 hold the button 108 in the ideal sealing position as soon as they are fully seated in the button 108. If additional force is applied to the compression pins 340, the button 108 will remain in place and the spring seal 114 will not be deformed. This is a repeatable process that an operator can perform with little difficulty, saving time and reducing scrap components relative to other methods of assembling a sprinkler.

In an alternative embodiment, three or more compression pins 340 are used to force the button 108 downward and compress the spring seal 114. Accordingly, the number of compression pin apertures 246 and the number of compression pin recesses 202 may correspond to the number of compression pins 340. In one embodiment, three compression pins 340 are used, each offset by 120 degrees.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire suppression system as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A sprinkler, comprising:
a body defining:
a passage along a longitudinal axis, the passage having an inlet; and
an outlet fluidly coupled with the passage;
a button positioned within the passage, the button including:
a main body defining an engagement surface;
a tail projection that is positioned on a same side of the main body as the engagement surface and that extends away from the main body along the longitudinal axis; and
a slot extending through the tail projection perpendicular to the longitudinal axis, the slot split into a first section and a second section;
the first section of the slot defining a first alignment surface positioned between a pair of second alignment surfaces;
the second section of the slot defining the first alignment surface positioned between the pair of second alignment surfaces;
a thickness of the slot formed between the first alignment surface and the pair of second alignment surfaces of the first section and the first alignment surface and the pair of second alignment surfaces of the second section;
an activation assembly coupled with the button, the activation assembly to release the button from within the passage in response to a temperature reaching a threshold temperature, the activation assembly comprising a lever coupled with a link, the lever to engage with the button causing the button to push a seal against the body, the link to separate in response to the temperature reaching the threshold temperature causing the lever to disengage with the button;
a deflector coupled with the body; and
the seal coupled with the engagement surface of the button, the seal and the button to fluidly seal the inlet from the outlet, the seal comprising an aperture to receive the tail projection.

2. The sprinkler of claim 1, the seal comprising
a first sealing surface engaging the body; and
a second sealing surface opposite the first sealing surface and engaging the engagement surface.

3. The sprinkler of claim 1, comprising:
the inlet and the outlet aligned to define the longitudinal axis of the passage; and
the deflector coupled with the body, with the longitudinal axis passing through the deflector.

4. The sprinkler of claim 1, wherein a shoulder of the body, the seal, the main body, and the tail projection are substantially centered along the longitudinal axis.

5. The sprinkler of claim 4, wherein the engagement surface is substantially parallel to the shoulder.

6. The sprinkler of claim 4, wherein the shoulder that is annular.

7. The sprinkler of claim 1, wherein the seal includes a flexible coating, and wherein the flexible coating engages the tail projection to couple the seal with the button.

8. The sprinkler of claim 1, comprising:
the seal configured to surround the tail projection.

9. The sprinkler of claim 1, wherein:
the seal includes a flexible coating; and
the tail projection is to deform the flexible coating.

10. A sprinkler, comprising:
a body defining:
a passage along a longitudinal axis, the passage having an inlet;
an outlet fluidly coupled with the passage; and
a compression pin aperture to receive a compression pin;
a button positioned within the passage, the button comprising:
a tail projection that extends away from an engagement surface in a direction along the longitudinal axis; and
a slot extending through the tail projection perpendicular to the longitudinal axis, the slot split into a first section and a second section;
the first section of the slot defining a first alignment surface positioned between a pair of second alignment surfaces;
the second section of the slot defining the first alignment surface positioned between the pair of second alignment surfaces;
a thickness of the slot formed between the first alignment surface and the pair of second alignment surfaces of the first section and the first alignment surface and the pair of second alignment surfaces of the second section;
an activation assembly coupled with the button, the activation assembly to release the button from within the passage in response to a temperature reaching a threshold temperature, the activation assembly comprising a lever coupled with a link, the lever to engage with the button causing the button to push a seal against the body, the link to separate in response to the temperature reaching the threshold temperature causing the lever to disengage with the button;
a deflector coupled with the body;
the seal to engage the engagement surface and the body, the seal to receive the tail projection, the tail projection split by a slot; and
the compression pin aperture positioned to engage the button to force the button against the seal with the compression pin inserted into the compression pin aperture.

11. A method of manufacturing a sprinkler, comprising:
providing a body, the body defining:
a passage extending along a longitudinal axis between an inlet and an outlet;

a seat; and a tooling pin aperture extending from an outer surface of the body to the passage;

inserting a seal and a button into the passage, the button defining a tooling pin recess, the seal having an aperture to receive a tail projection of the button, a slot extending through the tail projection along the longitudinal axis, the slot split into a first section and a second section, the first section of the slot defining a first alignment surface positioned between a pair of second alignment surfaces, the second section of the slot defining the first alignment surface positioned between the pair of second alignment surfaces, a thickness of the slot formed between the first alignment surface and the pair of second alignment surfaces of the first section and the first alignment surface and the pair of second alignment surfaces of the second section;

providing an activation assembly coupled with the button, the activation assembly to release the button from within the passage in response to a temperature reaching a threshold temperature, the activation assembly comprising a lever coupled with a link, the lever to engage with the button causing the button to push the seal against the body, the link to separate in response to the temperature reaching the threshold temperature causing the lever to disengage with the button;

orienting the button about the longitudinal axis such that the tooling pin recess aligns with the tooling pin aperture; and inserting a tooling pin through the tooling pin aperture and into the corresponding tooling pin recess such that the seal is compressed between the seat and the button.

12. The method of claim 11, wherein the body defines at least two tooling pin apertures, wherein inserting the tooling pin through the tooling pin aperture includes inserting each tooling pin through the corresponding tooling pin aperture and into the corresponding tooling pin recess.

13. The method of claim 12, wherein the button defines at least two tooling pin recesses, and wherein each tooling pin is inserted into a different one of the tooling pin recesses.

14. The method of claim 11, wherein orienting the button about the longitudinal axis includes engaging an alignment device with a first alignment feature defined by the button and a second alignment feature defined by the body.

15. The method of claim 14, wherein the first alignment feature is a first alignment recess defined by the button, wherein the second alignment feature is a second alignment recess defined by the body, and wherein engaging the alignment device with the first alignment feature and the second alignment feature includes inserting the alignment device into the first alignment recess and the second alignment recess.

* * * * *